C. J. MARTH.
WRINGER.
APPLICATION FILED MAR. 16, 1912.
1,047,544.
Patented Dec. 17, 1912.
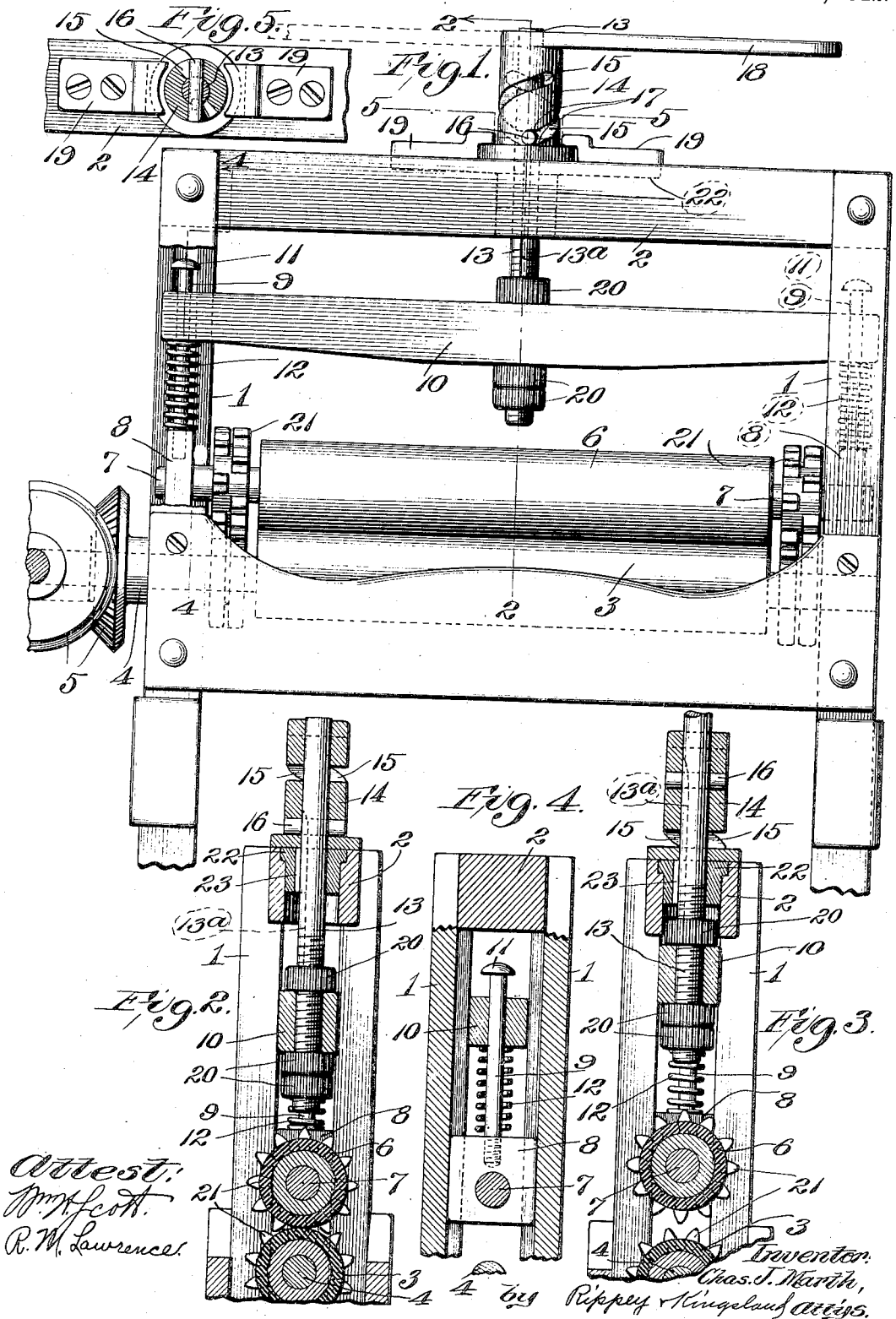

UNITED STATES PATENT OFFICE.

CHARLES J. MARTH, OF ST. LOUIS, MISSOURI, ASSIGNOR TO WAYNE MANUFACTURING COMPANY, OF ST. LOUIS, MISSOURI, A CORPORATION OF MISSOURI.

WRINGER.

1,047,544. Specification of Letters Patent. Patented Dec. 17, 1912.

Application filed March 16, 1912. Serial No. 684,282.

*To all whom it may concern:*

Be it known that I, CHARLES J. MARTH, a citizen of the United States, residing at the city of St. Louis and State of Missouri, have invented a new and useful Wringer, of which the following is a specification.

This invention has reference to wringers, and it comprises novel and efficient mechanism whereby the rolls may be disengaged and released, quickly and without damage, to release any object that may become caught between the rolls.

An object of the invention is to provide an improved wringer in which one roll is journaled in bearings arranged to be held rigid, and in which the other (and in this case the upper) roll is journaled in movable bearings; said bearings being held by a presser-bar, with springs interposed between said presser-bar and said bearings whereby the roll carried by said movable bearings will be held in contact with said first-named roll; in combination with manually operable and adjustable means for depressing or raising said presser-bar to engage or disengage said rolls.

Another object is to improve the releasing mechanism of wringer rolls in order that the object between the rolls will positively disengage and separate the rolls when the release device is operated to release the rolls.

Other objects will appear from the following description, reference being made to the accompanying drawings in which—

Figure 1 is an elevation of a wringer having my invention combined therewith and embodied therein, and Fig. 2 is a sectional view on the line 2—2 of Fig. 1, showing the movable roll pressed against the other roll, and the manipulative release device latched in position to hold the rolls pressed against each other. Fig. 3 is a similar sectional view showing the movable roll raised and released from the other roll, and the manipulative release device released to permit separation of the rolls. Fig. 4 is a sectional view on the line 4—4 of Fig. 1 showing the connection between one of the movable bearings for the upper roll and the movable presser-bar, and also showing the spring interposed between the bearing and the presser-bar, it being understood that this arrangement is the same at each end of the roll. Fig. 5 is a sectional view of the release device on the line 5—5 of Fig. 1.

Each end of the wringer frame consists of two spaced uprights 1 connected at their upper ends by a cross-bar 2. The lower roll 3 is on a shaft 4 which is journaled in bearings between the uprights 1, said shaft extending outwardly for connection with an operating crank or suitable power mechanism, certain connections for which are shown at 5 (Fig. 1).

The upper roll 6 has a shaft 7 journaled in bearings 8 which are arranged to be moved vertically between the uprights 1. A rod 9 is attached to each bearing 8, and said rods pass through holes in the presser-bar 10, said rods having heads 11 on their upper ends; so that when the presser-bar is raised the rods 9 and bearings 8 will also be raised to disengage, or permit disengagement of, the roll 6 from the roll 3. Pressure springs 12 encircle the rods 9 between the bearings 8 and the presser-bar 10, and impart yielding pressure to hold the roll 6 against the roll 3 when the presser-bar is held or latched down.

A member 13 is connected to the presser-bar 10 and extends through an opening in the cross-bar 2, and constitutes a part of the means for manipulating the presser-bar to engage and disengage the rolls. The upper end of the member 13 is encircled by a revoluble collar 14 which is provided with two spiral or winding slots 15 whose walls constitute cam surfaces for a pin 16 which is rigid with the member 13, and which extends into said slots. Thus, manipulation of the collar 14 will raise or depress the member 13, and thereby raise or depress the presser-bar 10 to disengage or engage the rolls. The slots 15 run horizontally at their lower ends, as indicated at 17, the horizontal upper walls of the slots constituting shoulders to receive the pin 16, so that the parts may be latched in the adjustment shown in Fig. 1, in which the rolls are in engagement with each other. When the collar is turned to release the pins 16 from the shoulders 17 the springs 12 expand and raise the presser-bar 10, thus relieving the pressure of the upper roll 6 against the lower roll 3. A handle 18 may be employed to operate the collar or controlling device to press the rolls together, or release them. Clips 19 attached to the cross-bar 2 engage with and assist in holding the collar 14 in position. The pressure or tension exerted upon the presser-bar by the device 14 may be varied by changing the adjustment of the nuts 20 in a manner obvious from an examination of the drawing. Gears 21 on the shafts 4 and 7 constitute means for positively rotating both rolls together, when the wringer is in use.

Further description of the invention is superfluous, and it will be readily comprehended by those skilled in the art to which it pertains, without extended or enlarged explanation. It will be understood also that I do not restrict myself to the identical arrangement or construction shown, since it is obvious that many variations may be employed within equivalent limits without departure from the nature and the spirit and the scope of my invention.

What I claim and desire to secure by Letters Patent is—

1. In a wringer, the combination of a roll, vertically movable bearings holding said roll, a presser-bar, rods connecting said bearings and said presser-bar, springs between said bearings and said presser-bar, a member connected to said presser-bar, a cam device on said member operable to raise and lower said presser-bar to release and compress said springs, a handle rigid on said cam device, and means independent of said cam device for varying the position of said member and varying the pressure imparted by said presser-bar against said springs, substantially as specified.

2. In a wringer, the combination of a roll, bearings holding said roll, a movable presser-bar, rods extending from said bearings, means on said rods for stopping movement of said presser-bar away from said bearings, springs between said presser-bar and said bearings, a member connected to said presser-bar, means for varying the length of that portion of said member which extends upwardly from said presser-bar, and a cam device operable to actuate said member and cause said presser-bar to compress or release said springs, substantially as specified.

3. In a wringer, the combination of a roll, bearings holding said roll, a presser-bar, rods connecting said bearings and said presser-bar, springs between said presser-bar and said bearings, means limiting movement of said presser-bar away from said bearings, a cross-bar, a member extending from said presser-bar through said cross-bar, a pin on said member above said cross-bar, a collar revolubly encircling said member above said cross-bar and having spiral slots receiving said pin, a handle for rotating said revoluble collar on said member, and means on said cross-bar holding said collar in position thereon, substantially as specified.

4. In a wringer, the combination of a roll, bearings holding said roll, rods connected to said bearings, a presser-bar having holes through which said rods extend, springs mounted between said presser-bar and said bearings, means limiting movement of said presser-bar away from said bearings, a cross-bar, a member extending upwardly from said presser-bar through said cross-bar, means for varying the length of that portion of said member which extends upwardly from said presser-bar, a collar revolubly encircling said member above said cross-bar and having spiral slots, a pin on said member projecting into said slots, a handle for rotating said revoluble collar, and means on said cross-bar for holding said collar in position, substantially as specified.

In witness whereof, I have signed this specification in the presence of two subscribing witnesses.

CHARLES J. MARTH.

Witnesses:
F. W. ROSSKOPF,
J. D. RIPPEY.